United States Patent Office 3,463,822
Patented Aug. 26, 1969

3,463,822
SUBSTITUTED AROMATIC VINYL
OXY THIOETHERS
Kenneth Wayne Ratts, Creve Coeur, and Angelina Ngo
Yao, University City, Mo., assignors to Monsanto Company, St. Louis, Mo., a corporation of Delaware
No Drawing. Filed May 11, 1966, Ser. No. 549,168
Int. Cl. C07c *149/10;* A01n *9/12;* A61k *27/00*
U.S. Cl. 260—609        14 Claims

ABSTRACT OF THE DISCLOSURE

Compounds of the formula $$CH_2=C-O-CH_2-S-CH_2Y$$
$$|$$
$$Z$$

wherein Y is hydrogen or $R^3X_n$ wherein $R^3$ has a maximum of 12 carbon atoms and is alkyl, alkenyl or monocyclicaryl, X is halogen and n is an integer from zero to five inclusive, and Z is naphthyl or

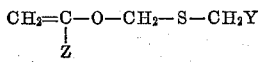

wherein R is halogen or alkyl of not more than 4 carbon atoms, $R^1$ is nitro or alkoxy of not more than 4 carbon atoms, $R^2$ is phenyl, a is an integer from 0 to 5 inclusive, b is an integer from 0 to 2 inclusive and c is an integer 0 or 1; are prepared by heating above about 50° C. in the presence of a liquid proton donor medium a compound of the formula

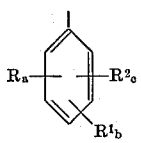

wherein Y and Z are as defined above. These compounds are useful as fungicides and nematocides.

---

This invention relates to novel vinyl aromatic compounds and to processes for making them. This invention further relates to pesticidal compositions and methods of fungicidal and nematocidal control.

The vinyl aromatic compounds of this invention are represented by the formula $$CH_2=C-O-CH_2-S-CH_2Y$$
$$|$$
$$Z$$

wherein Y is selected from the group consisting of hydrogen and $R^3X_n$ wherein $R^3$ has a maximum of 12 carbon atoms and is selected from the group consisting of alkyl, alkenyl and monocyclicaryl, X is halogen (Cl, Br, F and I) and n is an integer from 0 to 5 inclusive, and Z is selected from the group consisting of naphthyl and

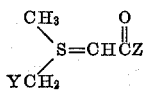

wherein R is selected from the group consisting of halogen (Cl, Br, F and I) and alkyl of not more than 4 carbon atoms, $R^1$ is selected from the group consisting of $NO_2$ and alkoxy of not more than 4 carbon atoms, $R^2$ is phenyl, a is an integer from 0 to 5 inclusive, b is an integer from 0 to 2 inclusive and c is an integer from 0 to 1.

Representative $R^3X_n$ for Y in the above formula include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl having from 1 to 12 carbon atoms, alkenyl such as vinyl, allyl, a-butyl - 1, n-butenyl - 2, n-pentenyl - 2, n-hexyl - 2, 2,3-dimethylbutenyl-2, n-heptenyl, n-decanyl, n-dodecenyl and the various homologues and isomers of alkenyl having 2 to 12 carbon atoms, monocyclicaryl such as phenyl, tolyl, ethylphenyl, xylyl, butylphenyl, tert-butylphenyl, trimethylphenyl, diethylphenyl and the like, haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3 - dichloropentyl, 3,3 - dibromopentyl, chlorohexyl, bromohexyl, 2,4 - dichlorohexyl, 1,3 - dibromohexyl, 1,3,4 - trichlorohexyl, chloroheptyl, bromoheptyl, fluoroheptyl, 1,3 - dichloroheptyl, 1,4,4 - trichloroheptyl, 2,4 - dichloromethylheptyl, chlorooctyl, bromooctyl, iodooctyl, 2,4 - dichloromethylhexyl, 2,4-dichlorooctyl, 2,4,4 - trichloromethylpentyl, 1,3,5 - tribromooctyl and the halogenated straight and branched chain nonyl, decyl, undecyl and dodecyl, haloalkenyl such as chlorovinyl, bromovinyl, chloroallyl, bromoallyl, 3-chloro-n-butenyl-1, 3 - chloro-n-pententyl-1, 3 - fluoro-n-heptenyl - 1, 1,3,3 - trichloro-n-heptenyl - 5, 1,3,5 - trichloro-n-octenyl-6, 2,3,3 - trichloromethylpentenyl-4 and the various homologues and isomers of haloalkenyl having 2 to 12 carbon atoms, and halomonocyclicaryl such as o-chlorophenyl, m-chlorophenyl, m-bromophenyl, p-chlorophenyl, 2,4 -dichlorophenyl, 3,5 - dichlorophenyl, 2,4,6 - tribromophenyl, 2,5 - diiodophenyl, 2,4,5-trichlorophenyl, 2,4,6 - trifluorophenyl, 2,3,4,6 - tetrachlorophenyl and 2,3,4,5,6 - pentachlorophenyl.

In the above formula the alkyl of R can be for example the alkyl disclosed above for Y having 1 to 4 carbon atoms. The alkoxy of $R^1$ can be for example methoxy, ethoxy, propoxy, isopropoxy, n-butoxy, sec-butoxy, isobutoxy and tert-butoxy.

The vinyl aromatic compounds of this invention are prepared by a process which comprises the thermal rearrangement of sulfonium ylids of the formula

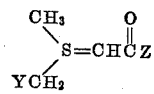

wherein Y and Z are as defined above, in the presence of a liquid proton donor medium at a temperature above about 50° C.

The temperature at which the thermal rearrangement of this invention is carried out is critical but only in regard to the lower limit. The thermal rearrangement must be carried out at a temperature above about 50° C. and is preferably carried out under reflux conditions at a temperature from about 75° C. to about 150° C. Rearrangement usually occurs in from a few minutes to 10 hours or more depending upon the temperature, proton donor medium and the specific sulfonium ylid. Pressure is not a critical factor in the rearrangement process of this invention. Pressure both above and below atmospheric pressure can be employed although atmospheric pressure is preferred for convenience.

The thermal rearrangement of this invention is carried out in the presence of a proton donor media such as (a) an aqueous medium which can optionally contain a water-miscible lower alkyl ($C_1$ to $C_4$) alcohol such as methyl alcohol, ethyl alcohol, propyl alcohol and butyl alcohol, and (b) alcoholic media comprising aliphatic alcohols containing not more than about 12 carbon atoms, for example, methyl alcohol, ethyl alcohol, propyl alcohol, butyl alcohol, amyl alcohol, dodecyl alcohol and the like.

The separation of the vinyl aromatic compounds from the rearrangement mixture is readily accomplished. The proton donor media can be removed by decantation, selective extraction, stripping or distillation, preferably low temperature vacuum distillation. The product, if desired, can be purified by any of the conventional means well-known in the art, e.g. fractional distillation under reduced pressure, selective extraction, fractional distillation using a carrier gas, film distillation, or any suitable combination of these methods.

Separation is preferably carried out by decantation when substantially aqueous proton donor media are employed. When substantially alcoholic proton donor media are employed recovery is preferably carried out with liquid-liquid extraction using, e.g. hydrocarbons such as benzene, toluene, xylene, cyclohexane, methylcyclohexane, n-heptane, n-hexane, and the like and organic halides such as carbon tetrachloride and chlorobenzene.

The vinyl aromatic compounds of this invention are liquid materials which are insoluble in water but somewhat soluble in many organic solvents, for example, alcohols, ketones, hydrocarbons such as benzene, toluene, xylene and the like, and chlorohydrocarbons such as chlorobenzene, carbon tetrachloride and the like.

The sulfonium ylids which are thermally rearranged in accordance with this invention are prepared by the process disclosed and claimed in application Ser. No. 549,166, now United States Patent 3,359,322 filed of even date herewith. Said process comprises reacting a sulfonium salt of the formula

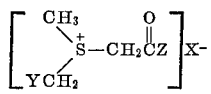

with a substantially equimolar amount of an alkaline material such as sodium hydride in the presence of an inert liquid media such as tetrahydrofuran, wherein Y and Z are as defined above and X is halogen.

The following examples illustrate the invention. Parts and percent are by weight unless otherwise indicated.

Example 1

A reaction mixture comprising about 25 parts of dimethylsulfonium-4'-phenylphenacylide and 330 parts of distilled water is heated at reflux for about 2½ hours. The reaction mixture is cooled and 15.9 parts of oily product are recovered by decantation. Nuclear magnetic resonance (NMR) spectrum analysis confirms the product, α[(methylthio)methoxy]-4'-phenylstyrene.

Calculated for $C_{16}H_{16}OS$: C, 74.96; H, 6.29; S, 12.51. Found: C, 75.20; H, 6.11; S, 12.19.

Example 2

A suitable reaction vessel is charged with about 3 parts of dimethylsulfonium-4'-chlorophenacylide and 100 parts of distilled water. The reaction mixture is heated at reflux for about 2 hours, cooled and extracted with ethyl ether. The extract is dried over magnesium sulfate and then fractionally distilled under vacuum to give 0.6 part of α-[(methylthio)methoxy]-4'-chlorostyrene having a boiling point of about 96° C. at a pressure of 0.3 mm. of mercury.

Calculated for $C_{10}H_{11}ClOS$: C, 55.94; H, 5.17; S, 14.93; Cl, 16.51. Found: C, 55.79; H, 5.30; S, 14.77; Cl, 16.24.

Example 3

A suitable reaction vessel is charged with about 7 parts of dimethylsulfonium-4'-bromophenacylide and 200 parts of distilled water. The reaction mixture is heated at reflux for about 2 hours, cooled and extracted with ethyl ether. The extract is dried over magnesium sulfate and then fractionally distilled under vacuum to give about 1.7 parts of α-[(methylthio)methoxy]-4'-bromostyrene having a boiling point of about 120° C. at a pressure of 40 mm. of mercury. The product is confirmed by NMR spectrum analysis.

Calculated for $C_{10}H_{11}BrOS$: C, 46.34; H, 4.28; Br, 30.84. Found: C, 46.10; H, 4.14; Br, 31.06.

Example 4

A suitable reaction vessel is charged with about 7 parts of dimethylsulfonium 1-naphthacylide and about 250 parts of distilled water. The reaction mixture is heated at reflux for about two hours, cooled, and the non-rearranged solid removed by filtration. The reaction mixture is extracted with ethyl ether and the extract is evaporated under vacuum to give 4 parts of a reddish oil, 1-[α-(methylthio)-methoxyvinyl]-naphthalene. Infrared and NMR spectra analysis confirm the product.

Calculated for $C_{14}H_{14}OS$: C, 75.00; H, 6.12; S, 13.92. Found: C, 72.90; H, 6.18; S, 13.82

Following substantially the same procedure as in the foregoing examples and using the appropriate dimethylsulfonium ylids the following vinyl aromatic compounds of this invention are prepared:

α-[(methylthio)methoxy]styrene
α-[(2-chloropropylthio)methoxy]styrene
α-[(ethylthio)methoxy]styrene
α-[(3-chlorobutylthio)methoxy]styrene
α-[benzylthio)methoxy]styrene
α-[(p-chlorobenzylthio)methoxy]styrene
α-[(2',4'-dichlorobenzylthio)methoxy]styrene
α-[(2',4',5'-trimbromobenzylthio)methoxy]styrene
α-[(2',3',4',5'-tetrachlorobenzylthio)methoxy]styrene
α-[(p-methylbenzylthio)methoxy]styrene
α-[(2',4'-dimethylbenzylthio)methoxy]styrene
α-[(p-trichloromethylbenzylthio)methoxy]styrene
α-[(p-bromomethylbenzylthio)methoxy]styrene
α-[(p-tert-butylbenzylthio)methoxy]styrene
α-[(2',4',6'-trimethylbenzylthio)methoxy]styrene
α-[(p-fluorobenzylthio)methoxy]styrene
α-[(2-bromopropylthio)methoxy]styrene
α-[(2-buten-1-ylthio)methoxy]styrene
α-[(3-hepten-1-ylthio)methoxy]styrene
α-[(tert-butylthio)methoxy]styrene
α-[(octylthio)methoxy]styrene
α-[(methylthio)methoxy]-2',4'-dichlorostyrene
α-[(methylthio)methoxy]-2',4',6'-trichlorostyrene
α-[(methylthio)methoxy]-2',4'-dibromostyrene
α-[(methylthio)methoxy]-4'-iodostyrene
α-[(methylthio)methoxy]-2',4'-difluorostyrene
α-[(methylthio)methoxy]-4'-methylstyrene
α-[(methylthio)methoxy]-2',4'-dimethylstyrene
α-[(methylthio)methoxy]-2'-tert-butylstyrene
α-[(methylthio)methoxy]-4'-nitrostyrene
α-[(methylthio)methoxy]-2',4'-dinitrostyrene
α-[(methylthio)methoxy]-4'-methoxystyrene
α-[(methylthio)methoxy]-2',6'-dibutoxystyrene The vinyl aromatic compounds of this invention are useful as pesticides, particularly fungicides and nematocides. In practicing the fungicidal methods of this invention, one or more of the present vinyl aromatic compounds is applied to the fungal organisms or the material to be treated for the control of fungi in an amount sufficient to exert fungicidal activity. The fungicidal compounds of this invention are particularly effective when applied directly to the soil for control of soil-borne fungal organisms. They are also effective in the treatment of plant life such as vegetables, ornamental plants and fruit-bearing trees; organic fibers and fabrics; leather; paints and lubricating oils, and various cellulosic materials such as wood. In application to soil and plants, fungicidal control is obtained in most instances by the application of from about 0.01 pound to about 25 pounds of active ingredient per acre. The preferred amount is determined by and dependent upon the particular fungicidal compound selected, the method of application, and in the case of application of plant life, the state and condition of growth and the climatic conditions.

The effectiveness of the vinyl aromatic compounds of this invention as fungicides is illustrated below.

Slide germination test: The concentration of active ingredient required to substantially inhibit germination of spores from 7- to 10-day old cultures of *Venturia inaequalis* is determined by the slide germination test. A concentrated formulation of 1.0 gram of α-[(methylthio)-methoxy]-4'-chlorostyrene, acetone and 0.1 gram of sorbitan monolaurate polyoxyethylene derivative (a commercial water-soluble non-ionic emulsifying agent) is prepared. The concentrated formulation is diluted with sufficient water to provide an aqueous emulsion containing 10 p.p.m. of the styrene. To a test tube is then added four volumes of the aqueous emulsion, one volume of spore stimulant and one volume of spore suspension, the spore stimulant being added to insure a high and relatively stable percentage of germination in the control. Drops of the test specimen mixture and an untreated control are pipetted onto glass slides. The glass slides are then placed in moist chambers for 20 hours incubation and 22° C. Germination counts are made by counting 100 potentially viable spores, i.e. those spores which would germinate under the normal conditions of the control. It was found that the fungicidal α-[(methylthio)methoxy]-4'-chlorostyrene substantially inhibited germination of spores whereas the control spores completely germinated.

In the treatment of Nemathelminthes in soil and plant systems in accordance with this invention, the anthelmintic vinyl aromatic compounds are preferably applied to the area to be treated as granules with a conventional fertilizer spreader, as emulsifiable concentrate or wettable powder with a sprayer, or as a dust with a conventional duster, or they can be absorbed in activated carbon for application to seeds.

Veterinary application of anthelmintic compounds in accordance with this invention for the treatment of Nemathelminthes in animals can be carried out with anthelmintic compositions in the form of a liquid drench, suitably formulated tablets or capsules, or animal feed compositions. The anthelmintic vinyl aromatic compounds can be incorporated into any of the general types of feed rations conventionally fed to animals, e.g. dry laboratory chow diets; moist, semi-solid diets; relatively dry grain forage mixtures, and the like as well as in the drinking water taken in by the animal to be treated. In the treatment of animal parasitic worms the anthelmintic compounds are preferably administered orally as a liquid drench or tablet or capsule in unit dosage form. Alternatively, the anthelmintic compounds can be incorporated into urea or salt licks or blocks.

The anthelmintic compounds are usually applied to soil in the treatment of Nemathelminthes at a rate from about 0.001 to about 100 pounds per acre. Veterinary compositions for use in controlling parasitic infestations in animals vary widely with respect to amount of anthelmintic compound depending upon factors such as type of composition, type of host animal to be treated, the dose level desired and the severity and type of parasitic infestation. Generally the anthelmintic compound is employed in an amount from about 5 mg./kg. to about 500 or more mg./kg. of body weight of the treated animal.

The anthelmintic compounds of this invention also can be applied to the parasitic infestations in admixture with other anthelmintics, medicaments, vitamin additive mixtures, and the like.

The nematocidal activity of the vinyl aromatic compounds of this invention is illustrated below:

An aqueous supension of the nematode *Turbatrix aceti* is admixed with α-[(methylthio)methoxy]styrene to provide an admixture containing 10 p.p.m. of the styrene. A complete kill of the nematode is effected by this treatment.

The above procedure is repeated using 1-[α-(methylthio)methoxyvinyl]naphthalene and α - [(methylthio) methoxy]-p-chlorostyrene and in both cases a complete kill of the nematode is obtained.

The pesticidal compositions (i.e., fungicidal and nematocidal) of this invention contain at least one active ingredient and a material refrerred to in the art as a fungicidal or nematocidal adjuvant in liquid or solid form. The pesticidal compositions are prepared by admixing the active ingredient with an adjuvant including diluents, extenders, carriers and conditioning agents to provide compositions in the form of finely-divided particulate solids, granules, pellets, aerosols, solutions and aqueous dispersions or emulsions. Thus, the active ingredient can be used with an adjuvant such as a finely-divided particulate solid, a liquid or organic origin, water, a wetting agent, dispersing agent, an emulsifying agent or any suitable combination of these.

Typical finely-divided solid carriers and extenders which can be used in the pesticidal compositions of this invention include for example, the talcs, clays, pumice, silica, diatomaceous earth, quartz, fuller's earth, salt, sulfur, powdered cork, powdered wood, walnut flour, chalk, charcoal, tobacco dust, volcanic ash, and the like. Typical liquid diluents include for example, water, kerosene, Stoddard solvent, hexane, benzene, toluene, acetone, ethylene dichloride, xylene, alcohols, Diesel oil, glycols and the like. Typical diluents for aerosols include, for example, Freons such as trichlorofluoromethane, dichlorofluoromethane, and the like.

The pesticidal compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents, emulsifying agents and the like are included therein.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents.

The pesticidal compositions of this invention generally contain from about 0.005% to about 95% by weight of the active fungicidal or nematocidal ingredient.

The active compounds of the present invention can be employed in combination with other fungicides to give compositions that have broad spectrum fungicidal activity. In these mixtures, the auxiliary fungicidally active materials can be present in any desired amount, ordinarily from about 0.1 to about 20 parts by weight per one part by weight of a compound of this invention. In some instances it may even be desirable to employ two or more auxiliary fungicides.

Typical of the auxiliary fungicides that can be employed in combination with the compounds of the present invention are the following:

N-trichloromethylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate
Tetra copper calcium oxychloride
Tetrachloro-p-benzoquinone
2,3-dichloro-1,4-naphthoquinone
2-dichloro-6-(o-chloroanilino)triazine
Ethylene thiuram monosulfide
2-heptadecyl glyoxalidine acetate
Ferric dimethyl dithiocarbamate plus 2-mercaptobenzothiazole Manganese dimethyl dithiocarbamate plus 2-mercaptobenzothiazole
Copper dihydrazinium sulfate
Copper-S-quinolinolate
Cycloheximide
Terramycin
Streptomycin When operating in accordance with the present invention the vinyl aromatic compounds or compositions containing them can be applied to the organisms to be controlled, or to their habitats in any convenient fashion, e.g. by means of hand dusters or sprayers. Applications to the above-ground portions of plants conveniently can be carried out with powder dusters, boom sprayers and spray dusters. In foliar applications, the employed compositions should not contain any appreciable amount of phytotoxic diluents. In large scale operations, dusts or low volume sprays may be applied from airplanes.

The term "pesticidal composition" as used herein is intended to mean not only compositions in a suitable form for application but also concentrated compositions which require dilution or extension with a suitable quantity of liquid or solid adjuvant prior to application.

The embodiments of the invention in which an exclusive property or privilege is claimed are defined as follows:

1. Compound of the formula

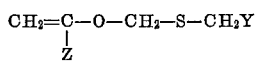

wherein Y is selected from the group consisting of hydrogen and $R^3X_n$ wherein $R^3$ has a maximum of 12 carbon atoms and is selected from the group consisting of alkyl, alkenyl and monocyclicaryl, X is halogen and $n$ is an integer from 0 to 5 inclusive, and Z is selected from the group consisting of naphthyl and

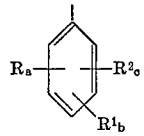

wherein R is selected from the group consisting of halogen and alkyl of not more than 4 carbon atoms, $R^1$ is selected from the group consisting of $NO_2$ and alkoxy of not more than 4 carbon atoms, $R^2$ is phenyl, $a$ is an integer from 0 to 5 inclusive, $b$ is an integer from 0 to 2 inclusive and $c$ is an integer from 0 to 1.

2. Compound of claim 1 which is α[(methylthio)methoxy]-4'-phenylstyrene.
3. Compound of claim 1 which is α-[(methylthio)methoxy]-4'-chlorostyrene.
4. Compound of claim 1 which is α-[(methylthio)methoxy]-4'-bromostyrene.
5. Compound of claim 1 which is α-[(methylthio)methoxy]styrene.
6. Compound of claim 1 which is α-[(phenylthio)methoxy]styrene.
7. Compound of claim 1 which is α-[(2',4',5'-tribromophenylthio)methoxy]styrene.
8. Compound of claim 1 which is α-[(p-bromomethylphenylthio)methoxy]styrene.
9. Compound of claim 1 which is α-[(2-buten-1-ylthio)methoxy]styrene.
10. Compound of claim 1 which is α-[(methylthio)methoxy]-2',4',6'-trichlorostyrene.
11. Compound of claim 1 which is α-[(methylthio)methoxy]-2',4'-dimethylstyrene.
12. Compound of claim 1 which is α-[(methylthio)methoxy]-2',6'-dibutylstyrene.
13. Compound of claim 1 which is 1-[α-(methylthio)methoxyvinyl]naphthalene.
14. Process for the preparation of a vinyl aromatic compound of the formula

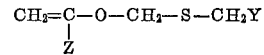

wherein Y is selected from the group consisting of hydrogen and $R^3X_n$ wherein $R^3$ has a maximum of 12 carbon atoms and is selected from the group consisting of alkyl, alkenyl and monocyclicaryl, X is halogen and $n$ is an integer from 0 to 5 inclusive, and Z is selected from the group consisting of naphthyl and

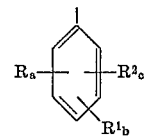

wherein R is selected from the group consisting of halogen and alkyl of not more than 4 carbon atoms, $R^1$ is selected from the group consistiing of $NO_2$ and alkoxy of not more than 4 carbon atoms, $R^2$ is phenyl, $a$ is an integer from 0 to 5 inclusive, $b$ is an integer from 0 to 2 inclusive, and $c$ is an integer from 0 to 1, which comprises heating a compound of the formula

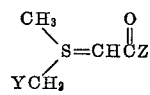

at a temperature above about 50° C. in the presence of a liquid proton donor medium selected from the group consisting of (a) an aqeuous medium, (b) an aqueous medium containing a water-miscible lower alkyl alcohol and (c) an alcoholic medium comprising an aliphatic alcohol containing not more than 12 carbon atoms or mixtures thereof, wherein Y and Z are as defined above.

References Cited

UNITED STATES PATENTS 2,875,250  2/1959  Heininger et al. _____ 260—609

CHARLES B. PARKER, Primary Examiner

D. R. PHILLIPS, Assistant Examiner

U.S. Cl. X.R.

424—337